FRICTION CLUTCH CONSTRUCTION

Original Filed March 7, 1963 2 Sheets-Sheet 1

INVENTOR.
WERNER R. E. HENSEL
BY Dicke & Craig
ATTORNEYS

FRICTION CLUTCH CONSTRUCTION

Original Filed March 7, 1963 2 Sheets-Sheet 2

INVENTOR.
WERNER R. E. HENSEL
BY Dicke & Craig
ATTORNEYS.

United States Patent Office

Re. 27,937
Reissued Mar. 5, 1974

27,937
FRICTION CLUTCH CONSTRUCTION

Werner R. E. Hensel, Berkheim uber Esslingen, Germany, assignor to Daimler-Benz Aktiengesellschaft, Stuttgart-Unterturkheim, Germany Original No. 3,279,573, dated Oct. 18, 1966, Ser. No. 263,489, Mar. 7, 1963. Application for reissue Sept. 5, 1968, Ser. No. 766,361
Claims priority, application Germany, Mar. 10, 1962, D 38,338
Int. Cl. F16d *25/12*
U.S. Cl. 192—87.11 23 Claims

Matter enclosed in heavy brackets [ ] appears in the original patent but forms no part of this reissue specification; matter printed in italics indicates the additions made by reissue.

*ABSTRACT OF THE DISCLOSURE*

*Two friction clutches, one nested within the other inside a rotating drum, on the same side of a disc portion supporting the drum.*

The present invention relates to an actuating mechanism for two friction clutches, especially shifting clutches in automatically shifted motor-vehicle change-speed transmissions which are arranged one next to the other within a rotating drum on the same side of a disk-like part supporting the drum.

Clutches of the aforementioned type have already been proposed in the prior art in which the actuating piston of one clutch is disposed on the other side of the disk-like part and is operatively connected with the pressure plate of the clutch by means of a sleeve engaging over the drum-shaped part. According to a further prior art proposal, the actuating piston disposed on the other side is constructed as double-acting piston in order to disengage the clutch by loading or acting upon the piston on the other side. Even though with such prior art construction a facilitated disengagement of the clutch against the centrifugal force of the oil and without use of large cup springs for the return of the actuating piston is made possible, both of the aforementioned prior art arrangements are complicated from a structural point of view and also offer difficulties as regards movement of the transmission sleeve on the drum-shaped part.

The present invention aims at an improvement of the aforementioned arrangements proposed heretofore in the prior art.

The present invention solves the problems with the clutches of the type described hereinabove by locating the actuating pistons of the two friction clutches on the same side of the disk-like part as the clutches themselves and by constructing the actuating piston for the first clutch simultaneously as the pressure cylinder which accommodates the actuating piston for the second friction clutch.

The arrangement according to the present invention entails a considerable constructional simplification. The transmission sleeve may be dispensed with altogether whereby the clutch diameter may be somewhat increased. Additionally, both the pressure cylinders and pistons may be constructed in a more simple and compact manner in the arrangement according to the present invention. The advantages of facilitated disengagement and the effect of one piston as a differential piston are thereby preserved so that the actuating operation is particularly suitable for such clutches of which one clutch has to transmit two different torques.

The actuating piston for the first clutch is operatively connected according to the present invention, with the pressure plate thereof by pressure elements which are supported in the drum-shaped part in an axially movable manner and which either by-pass outwardly or extend through the clutch disk or disks of the second clutch inclusive the abutment thereof. The disk-like part, according to the present invention, is provided radially inwardly thereof with a hub portion and at the outer circumference thereof with an annular portion and forms therewith a pressure cylinder for the actuating piston of the first clutch which, in its turn, is provided on the side opposite the disk-like part outwardly thereof with an annular extension into which is inserted the actuating piston for the second clutch.

The actuating piston for the second clutch forms with the end face opposite the disk-like part directly outwardly thereof the pressure plate for the second clutch or accommodates therein such pressure plate. The actuating piston for the second clutch is supported in proximity to the radially inner area thereof by return springs at the hub-like part or abutments securely connected thereto. The return springs may be constructed as one or several cup springs or coil springs.

The drum-like part is provided with an endless annular portion which serves as the fastening for the outer annular portion of the disk-like part. This annular portion of the drum-like part passes over into an entrainment portion which is split up by a plurality of longitudinal slots into tongue-shaped segments and which receives in the slots thereof the lamellae, abutments or counter bearings and pressure plates of the clutches. Longitudinal bores are provided in the annular portion which serve for the passage of the cylindrical pins effective as pressure elements which abut, on the one hand, against the end face of the actuating piston for the first clutch, and, on the other, against the pressure plate.

It is also appropriate if at least one longitudinal bore is coordinated to each slot between the segments whereby the flange or tab portions of the clutch lamellae engaging into the slots are recessed corresponding to the contour of the cylindrical pins.

The abutments for cloth clutches are of disk-shape construction and provided with outwardly extending flange or tab portions which correspond approximately to the slot width in the entrainment part. An annular groove is arranged in all sectors of the entrainment part and the abutments are inserted with the flange or tab portions thereof under rotation from the longitudinal slots into this annular groove and are secured in this position. However, it is also within the scope of the present invention to construct the abutment for the first clutch at the end of the sectors of the entrainment part in one piece with the same.

The present invention additionally aims at a further improvement of the general arrangement so far described hereinabove while at the same time preserving all the advantages mentioned hereinabove. Such further improvement is solved in accordance with the present invention by arranging the two clutches concentrically one about the other. Such an arrangement offers the advantage that the overall length of the clutch arrangement is considerably reduced and may be considerably simplified by eliminating several transmission elements.

According to a still further feature of the present invention, the first clutch transmitting a higher torque is arranged radially outwardly. By reason of such an arrangement, both clutches may be provided with the same or at least approximately the same number of disks whereby the same structural length results for both clutches. A further simplification of the last-described arrangement consists in arranging at both clutches the drum-shaped parts forming the output or driven element radially between both clutches and directly adjacent one another.

According to a modified construction in accordance with the present invention, the drum-shaped part receiving the clutches is made in one piece with the disk-like part and the hub portion thereof and is constructed in a pot-shaped manner as viewed in longitudinal cross section. The actuating piston for the first clutch is provided radially outwardly thereof with an annular extension the end face of which now forms directly the clutch pressure plate.

At least one discharge bore extending from the inside toward the outside for the pressure cylinder of the second clutch is arranged within the annular extension of the actuating piston for the first clutch and is adapted to be controlled by a valve. In this manner, a more rapid discharge of the oil aided by the centrifugal force may be achieved. The valve is appropriately so arranged and constructed that it maintains the aforementioned discharge bore closed by the spring force which, however, opens up the bore with a build-up of pressure in the first clutch and closes the bore with a build-up of pressure in both clutches or only in the second clutch.

Accordingly, it is an object of the present invention to provide a friction clutch construction of the type mentioned hereinabove which eliminates by simple and reliable means the aforementioned disadvantages and shortcomings normally encountered in the prior art.

Another object of the present invention resides in the provision of an actuating mechanism for two friction clutches, especially for shifting clutches of change-speed gears which is greatly simplified from a constructional point of view, offers no difficulties as regards transmission of the actuating forces or movements of the actuating parts, and may be constructed and asembled in a greatly facilitated manner.

A further object of the present invention resides in the provision of an actuating mechanism for two friction clutches of the type described hereinabove which results in a structural simplification and reduction in cost both as to manufacture and assembly thereof.

Still another object of the present invention resides in the provision of an actuating mechanism for two friction clutches in which the clutch diameters may be increased while maintaining the same overall outer dimensions of the mechanism as in the prior art arrangements.

Still another object of the present invention resides in the provision of an actuating mechanism for a plurality of friction clutches in which the pressure cylinders and pistons may be of simple construction, the arrangement thereof is compact and space saving, and the reliability of operation is greatly enhanced.

A further object of the present invention resides in the provision of an actuating mechanism for a plurality of friction clutches which not only assures facilitated disengagement of the clutches as well as use of a piston as differential piston but also takes into consideration the fact that one of the clutches may have to transmit two different torques depending, for example, on the speed engaged in a change-speed transmission.

Still another object of the present invention resides in the provision of an arrangement for actuating two friction clutches, especially shifting clutches of change-speed transmissions of motor vehicles in which the length of the entire clutch arrangement may be considerably reduced and numerous transmission elements may be dispensed with.

A further object of the present invention resides in the provision of an actuating mechanism for friction clutches in which the several clutches may have the same or at least approximately the same number of disks so as to provide the same length for both clutches.

Still a further object of the present invention resides in the provision of an actuating mechanism for two friction clutches in which the speed of disengagement of one of the clutches is increased substantially by utilizing the centrifugal force of the oil discharge.

These and other objects, features and advantages of the present invention will become more obvious from the following description when taken in connection with the accompanying drawing which shows, for purposes of illustration only, two embodiments in accordance with the present invention and wherein.

Figure 1:
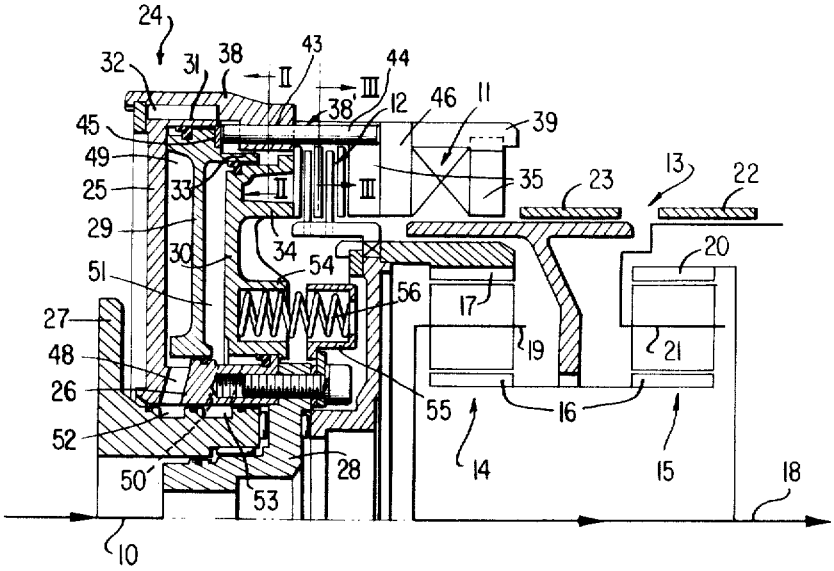
FIG. 1 is a longitudinal cross-sectional view through a first embodiment of a clutch arrangement in accordance with the present invention.

Referring now to the drawing wherein like reference numerals are used throughout the various views to designate like parts, and more particularly to FIG. 1, reference numeral 10 designates a schematically shown drive or input shaft adapted to drive a planetary gear transmission generally designated by reference numeral 13 by way of a first friction clutch generally designated by numeral 11 and/or by way of a second friction clutch generally designated by reference numeral 12. The planetary gear transmission 13 may be of any suitable construction, and, in the illustrated embodiment, consist of two planetary gear sets generally designated by reference numerals 14 and 15 of which the two sun gears 16 are connected with one another for rotation in unison and are adapted to be drivingly connected with the input shaft 10 by means of the first clutch 11. The ring gear 17 of the first planetary gear set 14 is adapted to be connected with the drive shaft 10 by the second clutch 12. The output shaft 18 is operatively connected with the planet carrier 19 of the first planetary gear set 14 with the ring gear 20 of the second planetary gear set 15. The planet carrier 21 of the second planetary gear set 15 and the two sun gears 16 are adapted to be braked by means of brakes 22 and 23, respectively. Of course, it is understood that any other suitable planetary change-speed gear or other change-speed gear may be used with the clutch actuating mechanism of the present invention.

Both clutches 11 and 12 are arranged directly adjacent one another within a drum-shaped part generally designated by reference numeral 24 which is connected with the disk-like part 25 for rotation in unison therewith. The disk-like part 25 is supported with the hub portion 26 thereof on a part 27 forming part of the stationary housing and is securely connected with a flange 28 of the drive shaft 10. Both clutches 11 and 12 are disposed on the same side of the disk-like part 25 and the actuating pistons 29 and 30 are also arranged on the same side of the disk-part 25. The disk-like part 25 is provided radially inwardly thereof with the aforementioned hub portion 26 and radially outwardly thereof with an annular portion 31. The disk-like part 25 with its hub portion 26 and its annular portion 31 serves as pressure cylinder for the actuating piston 29 of the first clutch 11. The annular portion 31 is also connected for rotation in unison with drum-shaped part 24 by means of a splined or toothed connection 32 or the like.

The actuating piston 29 is provided radially outwardly thereof and on the side opposite the disk-life part 25 with an annular extension 33. The actuating piston for the second clutch 12 is assembled between the annular extension 33 and the hub portion 26 and is suitably sealed with respect to both of these parts. The actuating piston 29 serves, therefore, as pressure cylinder for the actuating piston 30 of the second clutch 12. The actuating piston 30 forms outwardly with the end face 34 thereof directly the pressure plate for the second clutch 12.

The drum-shaped part 24 has a completely closed or endless anuular portion 38 which serves for fastening on the annular part 31. The portion 38 passes over into an entrainment part generally designated by reference numeral 38' which is split up by longitudinal slots generally designated by reference numeral 40 (FIG. 3) into segment-like tongue portions 39. The slots 40 receive the clutch lamellae 41 with the flange or tab portions 42 thereof as well as the abutments and pressure plates of the clutches. The abutments 35 of both clutches are constructed in a disk-shaped manner and are provided with outwardly facing flange or tab portions 36 (FIG. 3) of which the width corresponds approximately to the slots 40. The abutments 35 are assembled by means of these flange or tab portions 36 under corresponding rotation in an annular groove 37 at the entrainment part 38'. The abutments 35 are then secured in this position, for example, by screws or bolts.

Figure 2:
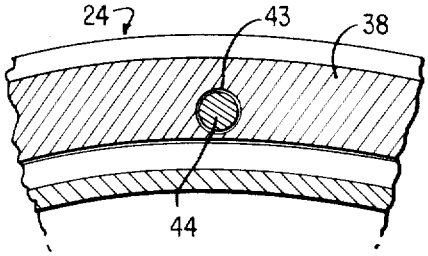
FIG. 2 is a partial cross-sectional view on an enlarged scale, taken along line II—II of FIG. 1.
Figure 3:
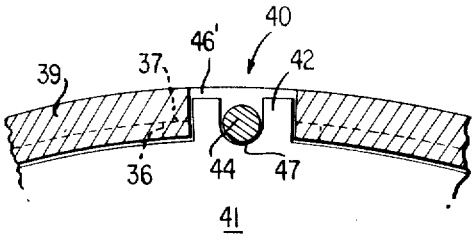
FIG. 3 is a partial cross-sectional view, also on an enlarged scale, taken along line III—III of FIG. 1.

Longitudinal bores 43 for the passage of cylindrical pins 44 (FIGS. 2 and 3) are disposed in the annular part 38. The cylindrical pins 44 serve as pressure elements and abut, on the one hand, against the end face 45 of the actuating piston 29, and, on the other, against the pressure plate 46 of the first clutch 11. At least one bore 43 corresponds to each slot 40, and the flange or tab portions 42 of the clutch lamellae 41 are provided with corresponding apertures 47 for receiving the cylindrical pins 44. The pressure plate 46 is, as shown in FIG. 3, inserted with the flange or tab portions 46' into the slots 40 between segments 39.

A bore 48 is provided within the hub portion 26 which leads to the pressure space 49 for the actuating piston 29. A further bore 50 leads to the pressure space 51 which is disposed between both actuating pistons 29 and 30. The supply of the pressure medium takes place in any known manner by way of annular grooves 52 and 53 provided within the housing part 27 or in any similar manner.

For purposes of engaging the first clutch 11 alone, the actuating piston 29 is loaded with pressure medium by way of groove 52, bore 48 and pressure space 49. The actuating piston 29 thereby displaces the pressure plate 46 toward the right as viewed in FIG. 1 by means of the cylindrical pins 44 and presses together the lamellae of the first clutch 11 with a force corresponding to the piston area. For purposes of engaging the second clutch 12 alone, the second actuating piston 30 is loaded with pressure medium by way of groove 53, bore 50 and pressure space 51—whereby the actuating piston 29 remains in its initial position—and therewith the lamellae of the second clutch 12 are pressed together by way of the end face 34.

For purposes of the simultaneous engagement of both clutch 11 and 12, pressure is applied to both spaces 49 and 51 in the manner described hereinabove. A differential effect is simultaneously obtained thereby at the actuating piston 29 so that the clutch 11 is engaged with a lesser force. This is necessary because, as in the illustrated embodiment, upon simultaneous engagement of both clutches 11 and 12, a direct speed is obtained and the clutch 11 only assumes or takes over a part of the torque.

For purposes of disengagement of the clutch 11 from this position, the pressure space 49 is simply relieved. As a result thereof, the pressure remaining within the space 51 between both pistons displaces the actuating piston 29 toward the left against the centrifugal force of the oil and the clutch 11 is thereby disengaged. A return spring is additionally coordinated to the piston 30. For the purpose, cup-shaped recesses 54 are provided within the radially inner area of the piston 30 and correspondingly constructed abutments 55 are disposed opposite the recesses 54. The abutments 55 threadably secured at the flange 28. Coil springs 56 are disposed between recesses 54 and abutments 55.

Figure 4:
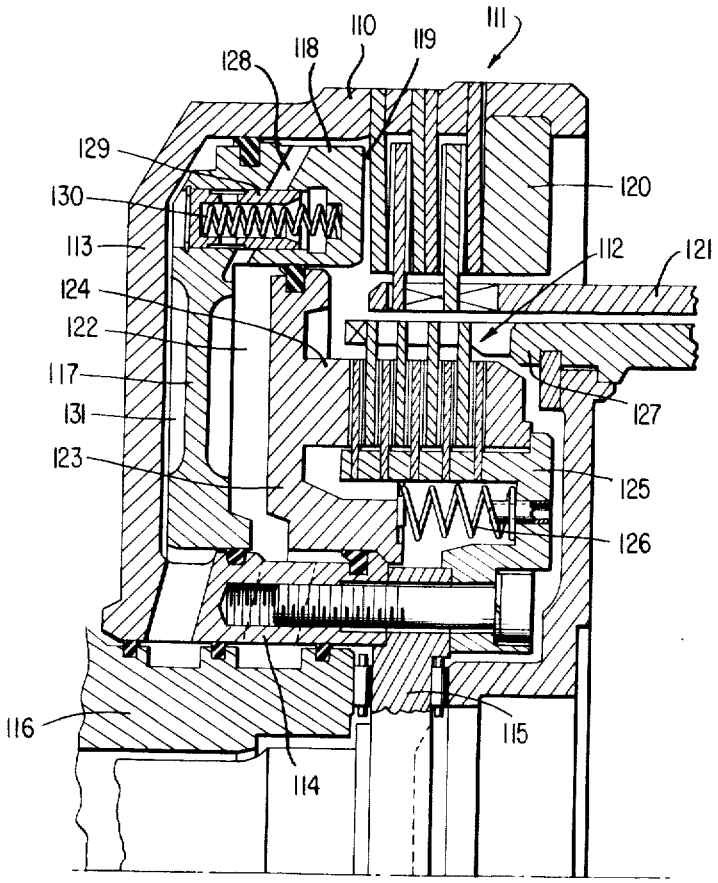
FIG. 4 is a longitudinal cross-sectional view through a modified embodiment of a clutch arrangement in accordance with the present invention.

Referring now to FIG. 4, a first clutch generally designated by reference numeral 111 and a second clutch generally designated by reference numeral 112 concentric within the first clutch 111 are arranged within a rotating drum-shaped part 110. Both clutches 111 and 112 are constructed as lamellae friction clutches. The drum-shaped part 110 is made in one piece with a disk-like part 113 and the hub portion 114. thereof. The drum-shaped part 110 is operatively connected in any suitable manner with a drive shaft 115 (not shown in detail), for example, is threadably secured thereto and is rotatably supported in any appropriate manner on a part 116 of the stationary transmission housing (not illustrated).

The drum-shaped part 110 forms the pressure cylinder for receiving the actuating piston 117 for the first clutch 111. The actuating piston 117 is provided radially outwardly thereof with an annular extension 118 the end face 119 of which serves directly as clutch pressure plate. The abutment 120 of this clutch 111 is inserted into the drum-shaped part 110 in the same manner as shown and described in FIG. 3. The output or driven part 121 of the clutch 111 constructed in a drum-shaped manner is disposed radially inwardly.

The actuating piston 117 again forms the actuating cylinder 122 for receiving therein the actuating piston 123 for the second clutch 112 which is constructed again, in principle, in the same manner as in FIG. 1. The actuating piston 123 is provided with an annular extension 124 serving as pressure plate for the clutch 112. The inner ring 125 of the clutch 112 serves simultaneously as abutment for the return springs 126 of the actuating piston 123. The drum-shaped driven part 127 is disposed radially outwardly directly adjacent to the driven part 121 of the clutch 111. The overall construction of the clutch arrangement as well as the operation and operative connections with the change-speed gear connected thereto corresponds, in principle, to the construction of FIG. 1 though it is understood that again any suitable change-speed gear may be used with the clutch actuating mechanism of FIG. 4.

The pressure cylinder 122 for the second clutch 112 may be emptied by way of at least one discharge bore 128 into the transmission housing. This bore 128 leads at an inclination from a point radially inwardly in a direction radially outwardly through the annular extension 118 and is adapted to be controlled by a valve 129. The valve 129 is kept in its left end position as viewed in FIG. 4 by a spring 130 and in this left end position closes the bore 128. The valve 129 also maintains this position if pressure builds up within the pressure cylinder 122 since this pressure, additional to the spring force of spring 130, presses against the right end face of the valve 129.

Even a simultaneous pressure build-up at the actuating pistons 117 and 123 of both clutches 111 and 112 is not able to open the valve 129. However, if the pressure within space 122 of the second clutch 112 drops off or disappears and the pressure remains on the first clutch 111, then the valve 129 is now displaced toward the right by the pressure on clutch 111 and is thereby able to open up the bore 128. The oil can now escape very rapidly out of the space 122 by reason of the centrifugal force.

While I have shown and described two embodiments in accordance with the present invention, it is understood that the same is not limited thereto but is susceptible of numerous changes and modifications within the spirit and scope thereof, and I, therefore, do not wish to be limited to the details shown and described herein but intend to cover all such changes and modifications as are encompassed by the scope of the appended claims.

I claim:

1. An actuating mechanism for two friction clutches, especially for shifting clutches in automatically-shifted motor vehicle change-speed transmissions, which are arranged within a rotating drum-like structure on the same side of a disk-like part supporting the drum-shaped structure and include abutment means and friction disks, comprising:

first actuating piston means for one of said clutches, second actuating piston means for the other of said clutches, said first and second actuating piston means being disposed on the same side of said disk-like part as the respective clutches, and the first actuating piston means serving simultaneously as pressure cylinder means for receiving the second actuating piston means, first pressure plate means for the first clutch, and pressure members operatively connecting said first actuating piston means with said first pressure plate means, said pressure members being supported in an axially movable manner within slots provided in said drum-shaped structure and extending through the friction disks and abutment means of the second clutch.

2. An actuating mechanism for two fricton clutches, especially for shifting clutches in automatically-shifted motor vehicle change-speed transmissions, which are arranged within a rotating drum-like structure on the same side of a disk-like part supporting the drum-shaped structure and include abutment means and friction disks, comprising:

first actuating piston means for one of said clutches, second actuating piston means for the other of said clutches, said first and second actuating piston means being disposed on the same side of said disk-like part as the respective clutches, and the first actuating piston means serving simultaneously as pressure cylinder means for receiving the second actuating piston means, first pressure plate means for the first clutch and *a* pressure member[s] operatively connecting said first actuating piston means with said first pressure plate means, said pressure member being supported in an axially movable manner within slots provided in said drum-shaped structure and by-passing externally the friction disks and abutment means of the second clutch.

3. An actuating mechanism for two friction clutches, especially for shifting clutches in automatically shifted motor vehicle change-speed transmissions, which are arranged within a rotating drum-like structure on the same side of a disk-like part supporting the drum-shaped structure, comprising:

a disk-like part having radially inwardly thereof a hub portion, first actuating piston means for one of said clutches, second actuating piston means separate from said first actuating piston means for the other of said clutches, said first and second actuating piston means being slidably supported on said hub portion and being disposed on the same side of said disk-like part as the respective clutches, and the first actuating piston means serving simultaneously as pressure cylinder means for receiving the second actuating piston means, and said second actuating piston means being actuatable independently of said first actuating piston means, said first and second fricton clutches being axially adjacent to one another.

[4. An actuating mechanism for two friction clutches, especially for shifting clutches in automatically shifted motor vehicle change-speed transmissions, which are arranged within a rotating drum-like structure on the same side of a disk-like part supporting the drum-shaped structure, comprising:

first actuating piston means for one of said clutches, second actuating piston means separate from said first actuating piston means for the other of said clutches, said first and second actuating piston means being disposed on the same side of said disk-like part as the respective clutches and on the same side relative to the respective clutch and being actuatable independently of one another, and the first actuating piston means serving simultaneously as pressure cylinder means for receiving the second actuating piston means, said first friction clutch comprising disk means secured to said drum-shaped structure, said second friction clutch means including disk means secured to said second actuating piston means, said first and second friction clutches as well as said first and second actuating piston means being arranged concentrically about one another.]

[5. An actuating mechanism for two friction clutches, especially for shifting clutches in automatically shifted motor vehicle change-speed transmissions, which clutches are arranged within a rotating drum-like structure on the same side of a disk-like part supporting the drum-shaped structure and include friction disks and abutment means, comprising:

first actuating piston means for one of said clutches, second actuating piston means for the other of said friction clutches, said first and second actuating piston means being disposed on the same side of said disk-like part as the respective clutches, the first actuating piston means serving simultaneously as pressure cylinder means for receiving the second actuating piston means, said disk-like part being provided inwardly thereof with a hub portion and along the outer circumference thereof with an annular portion and forming therewith a pressure cylinder for the first actuating piston means, said first and second actuating piston means being slidably supported on said hub portion, and said first actuating piston means being provided outwardly on the side thereof opposite said disk-like part with an annular extension and the second actuating piston means being inserted between said annular extension and said hub portion.]

[6. An actuating mechanism for two friction clutches, especially for shifting clutches in automatically shifted motor vehicle change-speed transmissions, which clutches are arranged within a rotating drum-like structure on the same side of a disk-like part supporting the drum-shaped structure and include friction disks and abutment means, comprising:

first actuating piston means for one of said clutches, second actuating piston means for the other of said friction clutches, said first and second actuating piston means being disposed on the same side of said disk-like part as the respective clutches, the first actuating piston means serving simultaneously as pressure cylinder means for receiving the second actuating piston means, said disk-like part being provided inwardly thereof with a hub portion and along the outer circumference thereof with an annular portion and forming therewith a pressure cylinder for the first actuating piston means and said first actuating piston means being provided outwardly on the side thereof opposite said disk-like part with an annular extension and the second actuating piston means being inserted between said annular extension and said hub portion, and said first and second actuating piston means being slidably supported on said hub portion, said second actuating piston means directly forming at the end face opposite said disk-like part the pressure plate means for the second clutch means.]

[7. An actuating mechanism for two friction clutches, especially for shifting clutches in automatically shifted motor vehicle change-speed transmissions, which clutches are arranged within a rotating drum-like structure on the same side of a disk-like part supporting the drum-shaped structure and include friction disks and abutment means, comprising:

first actuating piston means for one of said clutches, second actuating piston means for the other of said friction clutches, said first and second actuating piston means being disposed on the same side of said disk-like part as the respective clutches, the first actuating piston means serving simultaneously as pressure cylinder means for receiving the second actuating piston means, said disk-like part being provided inwardly thereof with a hub portion and along the outer circumference thereof with an annular portion and forming therewith a pressure cylinder for the first actuating piston means and said first actuating piston means being provided outwardly on the side thereof opposite said disk-like part with an annular extension and the second actuating piston means being inserted between said annular extension and said hub portion, and said first and second actuating piston means being slidably supported on said hub portion, said second actuating piston means directly forming at the end face opposite said disk-like part the pressure plate means for the second clutch means, return spring means for said second actuating piston means located in proximity to the inner region thereof for supporting said hub portion against stationary abutment means, and said return spring means being supported between said second actuating piston means and said hub portion.]

8. An actuating mechanism for two friction clutches, especially for shifting clutches in automatically shifted motor vehicle change-speed transmissions, which clutches are arranged within a rotating drum-like structure on the same side of a disk-like part supporting the drum-shaped structure and include friction disks and abutment means, comprising:

first actuating piston means for one of said clutches, second actuating piston means for the other of said friction clutches, said first and second actuating piston means being disposed on the same side of said disk-like part of the respective clutches, the first actuating piston means serving simultaneously as pressure cylinder means for receiving the second actuating piston means, said disk-like part being provided inwardly thereof with a hub portion and along the outer circumference thereof with an annular portion and forming therewith a pressure cylinder for the first actuating piston means and said first actuating piston means being provided outwardly on the side thereof opposite said disk-like part with an annular extension and the second actuating piston means being inserted between said annular extension and said hub portion, said second actuating piston means directly forming outwardly at the end face opposite said disk-like part the pressure plate means for the second clutch means, return spring means for said second actuating piston means located in proximity to the inner region thereof for supporting said hub portion against stationary abutments means, said drum-shaped structure including a completely closed annular drum-portion serving for fastening onto the annular portion of the disk-like part and an entrainment portion split up by longitudinal slots into tongue-shaped segments for receiving therein the disk means, abutment means and pressure plate means of the clutches.

9. An actuating mechanism for two friction clutches, especially for shifting clutches in automatically shifted motor vehicle change-speed transmissions, which cltuches are arranged within a rotating drum-like structure on the same side of a disk-like part supporting the drum-shaped structure and include friction disks and abutment means, comprising:

first actuating piston means for one of said clutches, second actuating piston means for the other of said friction clutches, said first and second actuating piston means being disposed on the same side of said disk-like part as the respective clutches, the first actuating piston means serving simultaneously as pressure cylinder means for receiving the second actuating piston means, first pressure plate means in said one clutch and pressure means operatively connecting said first actuating piston means with said first pressure plate means, said pressure means being supported in an axially movable manner within said drum-shaped part and relative to the abutment means and friction disks of the second clutch, said disk-like part being provided inwardly thereof with a hub portion and along the outer circumference thereof with an annular portion and forming therewith a pressure cylinder for the first actuating piston means, and said first actuating piston means being provided outwardly on the side thereof opposite said disk-like part with an annular extension and the second actuating piston means being inserted between said annular extension and said hub portion, said second actuating piston means directly forming outwardly at the end face opposite said disk-like part the pressure plate means for the second clutch means, return spring means for said second actuating piston means located in proximity to the inner region thereof for supporting said hub portion against stationary abutment means, said drum-shaped structure including a completely closed annular drum-portion serving for fastening onto the annular portion of the disk-like part and an entrainment portion split up by longitudinal slots into tongue-shaped segments for receiving therein the disk means, abutment means and pressure plate means of the clutches, longitudinal bores being provided within said annular drum-portion which serve for the passage of cylindrical pins provided as said pressure means, said cylinder pins abutting on the one hand, against the end face of said first actuating piston means, and, on the other, against the first pressure plate means, at least one of said longitudinal bores each being coordinated to each longitudinal slot between segments, and the flange portions of the clutch lamellae engaging into the slots being recessed correspondingly to the contour of said cylindrical pins.

[10. An actuating mechanism for two friction clutches, especially for shifting clutches in automatically shifted motor vehicle change-speed transmissions, which clutches are arranged within a rotating drum-like structure on the same side of a disk-like part supporting the drum-shaped structure and include friction disks and abutment means, comprising:

first actuating piston means for one of said clutches, second actuating piston means for the other of said friction clutches, said first and second actuating piston means being disposed on the same side of said disk-like part as the respective clutches, the first actuating piston means serving simultaneously as pressure cylinder means for receiving the second actuating piston means, said disk-like part being provided inwardly thereof with a hub portion and along the outer circumference thereof with an annular portion and forming therewith a pressure cylinder for the first actuating piston means, and said first actuating piston means being provided outwardly on the side thereof opposite said disk-like part with an annular extension and the second actuating piston means being inserted between said annular extension and said hub portion, and both said first and second actuating piston means being slidably supported on said hub portion, return spring means for said second actuating piston means located in proximity to the inner region thereof for supporting said hub portion against stationary abutment means, and said return spring means being support between said second actuating piston means and said hub portion.]

[11. An actuating mechanism for two friction clutches, especially for shifting clutches in automatically shifted motor vehicle change-speed transmissions, which clutches are arranged within a rotating drum-like structure on the same side of a disk-like part supporting the drum-shaped structure and include friction disks and abutment means comprising:

first actuating piston means for one of said clutches, second actuating piston means for the other of said friction clutches, said first and second actuating piston means being disposed on the same side of said disk-like part as the respective clutches, ]

the first actuating piston means serving simultaneously as pressure cylinder means for receiving the second actuating piston means, first pressure plate means in said one clutch and pressure means operatively connecting said first actuating piston means with said first pressure plate means, said pressure means being supported in an axially movable manner within said drum-shaped part and relative to the abutment means and friction disks of the second clutch, said disk-like part being provided inwardly thereof with a hub portion and along the outer circumference thereof with an annular portion and forming therewith a pressure cylinder for the first actuating piston means, and said first actuating piston means being provided outwardly on the side thereof opposite said disk-like part with an annular extension and the second actuating piston means being inserted between said annular extension and said hub portion.]

12. An actuating mechanism for two friction clutches, especially for shifting clutches in automatically shifted motor vehicle change-speed transmissions, which clutches are arranged within a rotating drum-like structure on the same side of a disk-like part supporting the drum-shaped structure and include friction disks and abutment means, comprising:

first actuating piston means for one of said clutches, second actuating piston means for the other of said friction clutches, said first and second actuating piston means being disposed on the same side of said disk-like part as the respective clutches, the first actuating piston means serving simultaneously as pressure cylinder means for receiving the second actuating piston means, said disk-like part being provided inwardly thereof with a hub portion and along the outer circumference thereof with an annular portion and forming therewith a pressure cylinder for the first actuating piston means, and said first actuating piston means being provided outwardly on the side thereof opposite said disk-like part with an annular extension and the second actuating piston means being inserted between said annular extension and said hub portion, said drum-shaped structure including a completely closed annular drum-portion serving for fastening onto the annular portion of the disk-like part and an entrainment portion split up by longitudinal slots into tongue-shaped segments for receiving therein the disk means, abutment means and pressure plate means of the clutches.

13. An actuating mechanism for two friction clutches, especially for shifting clutches in automatically shifted motor vehicle change-speed transmissions, which clutches are arranged within a rotating drum-like structure on the same side of a disk-like part supporting the drum-shaped structure and include friction disks and abutment means, comprising:

first actuating piston means for one of said clutches, second actuating piston means for the other of said friction clutches, siad first and second actuating piston means being disposed on the same side of said disk-like part as the respective clutches, the first actuating piston means serving simultaneously as pressure cylinder means for receiving the second actuating piston means, first pressure plate means in said one clutch and pressure means operatively connecting said first actuating piston means with said first pressure plate means, said pressure means being supported in an axially movable manner within said drum-shaped part and relative to abutment means and friction disks of the second clutch, said disk-like part being provided inwardly thereof with a hub portion and along the outer circumference thereof with an annular portion and forming therewith a pressure cylinder for the first actuating piston means, and said first actuating piston means being provided outwardly on the side thereof opposite said disk-like part with an annular extension and the second actuating piston means being inserted between said annular extension and said hub portion, said drum-shaped structure including a completely closed annular drum-portion serving for fastening onto the annular portion of the disk-like part and an entrainment portion split up by longitudinal slots into tongue-shaped segments for receiving therein the disk means, abutment means and pressure plate means of the clutches, longitudinal bores being provided within said annular drum-portion which serve for the passage of cylindrical pins provided as said pressure means, said cylindrical pins abutting on the one hand, against the end face of said first actuating piston means, and, on the other, against the first pressure plate means, at least one of said longitudinal bores each being coordinated to each longitudinal slot between segments, and the flange portions of the clutch lamellae engaging into the slots being recessed correspondingly to the contour of said cylindrical pins.

14. An actuating mechanism for two friction clutches, especially for shifting clutches in automatically shifted motor vehicle change-speed transmissions, which are arranged within a rotating drum-like structure on the same side of a disk-like part supporting the drum-shaped structure and include friction disks, pressure plate means and abutment means, comprising:

first actuating piston means for one of said clutches, second actuating piston means for the other of said friction clutches, said first and second actuating piston means being disposed on the same side of said dis-like part as the respective clutches, the first actuating piston means serving simultaneously as pressure cylinder means for receiving the second actuating piston means, said drum-shaped structure including a completely closed annular drum portion serving for fastening onto an annular portion of the disk-like part, and an entrainment portion split up by longitudinal slots into tongue-shaped segments for receiving therein the disks, abutment means and pressure plate means of the clutches.

15. An actuating mechanism for two friction clutches, especially for shifting clutches in automatically shifted motor vehicle change-speed transmissions, which are arranged within a rotating drum-like structure on the same side of a disk-like part supporting the drum-shaped structure and include friction disks, pressure plate means and abutment means, comprising:

first actuating piston means for one of said clutches, second actuating piston means for the other of said friction clutches, said first and second actuating piston means being disposed on the same side of said disk-like part as the respective clutches, the first actuating piston means serving simultaneously as pressure cylinder means for receiving the second actuating piston means, said drum-shaped structure including a completely closed annular drum portion serving for fastening onto an annular portion of the disk-like part, and an entrainment portion split up by longitudinal slots into tongue-shaped segments for receiving therein the disks, abutment means and pressure plate means of the clutches, longitudinal bores being provided within said annular drum portion and serving for the passage of cylindrical pins, said cylindrical pins abutting on the one hand, against the end face of said first actuating piston means, and, on the other, against the pressure plate means of said one clutch.

16. An actuating mechanism for two friction clutches, especially for shifting clutches in automatically shifted motor vehicle change-speed transmissions, which are arranged within a rotating drum-like structure on the same side of a disk-like part supporting the drum-shaped structure and include friction disks, pressure plate means and abutment means, comprising:

first actuating piston means for one of said clutches, second actuating piston means for the other of said friction clutches, said first and second actuating piston means being disposed on the same side of said disk-like part as the respective clutches, the first actuating piston means serving simultaneously as pressure cylinder means for receiving the second actuating piston means, said drum-shaped structure including a completely closed annular drum portion serving for fastening onto an annular portion of the disk-like part, and an entrainment portion split up by longitudinal slots into tongue-shaped segments for receiving therein the disks, abutment means and pressure plate means of the clutches, longitudinal bores being provided within said annular drum portion and serving for the passage of cylindrical pins, said cylindrical pins abutting on the one hand, against the end face of said first actuating piston means, and, on the other, against the pressure plate means of said one clutch, at least one of said longitudial bores each being coordinated to each longitudinal slot between segments, and tab portions provided on the clutch disks which engage into the slots, being recessed corresponding to the contour of said cylindrical pins.

17. An actuating mechanism for two friction clutches, especially for shifting clutches in automatically shifted motor vehicle change-speed transmissions, which are arranged within a rotating drum-like structure on the same side of a disk-like part supporting the drum-shaped structure and include friction disks, pressure plate means and abutment means, comprising:

first actuating piston means for one of said clutches, second actuating piston means for the other of said friction clutches, said first and second actuating piston means being disposed on the same side of said disk-like part as the respective clutches, abutment means for each of said first and second clutch, the first actuating piston means serving simultaneously as pressure cyclinder means for receiving the second actuating piston means, said drum-shaped structure including a completely closed annular drum portion serving for fastening onto an annular portion of the disk-like part, and an entrainment portion split up by longitudinal slots into tongue-shaped segments for receiving therein the disks, abutment means and pressure plate means of the clutches, longitudinal bores being provided within said annular drum portion and serving for the passage of cylindrical pins, said cylindrical pins abutting on the one hand, against the end face of said fist actuating piston means, and, on the other, against the pressure plate means of said one clutch, at least one of said longitudinal bores each being coordinated to each longitudinal slot between segments, and tab portions provided on the clutch disks which engage into the slots, being recessed corresponding to the contour of said cylindrical pins, the abutment means for the clutches being of disk-shaped construction provided with outwardly extending tab portions which correspond approximately to the slot width in the entrainment portion.

18. An actuating mechanism for two friction clutches, especially for shifting clutches in automatically shifted motor vehicle change-speed transmissions, which are arranged within a rotating drum-like structure on the same side of a disk-like part supporting the drum-shaped structure and include friction disks, pressure plate means and abutment means, comprising:

first actuating piston means for one of said clutches, second actuating piston means for the other of said friction clutches, said first and second actuating piston means being disposed on the same side of said disk-like part as the respective clutches, abutment means for each of said first and second clutch, the first actuating piston means serving simultaneously as pressure cylinder means for receiving the second actuating piston means, said drum-shaped structure including a completely closed annular drum portion serving for fastening onto an annular portion of the disk-like part, and an entrainment portion split up by longitudinal slots into tongue-shaped segments for receiving therein the disks, abutment means and pressure plate means of the clutches, longitudinal bores being provided within said annular drum portion and serving for the passage of cylindrical pins, said cylindrical pins abutting on the one hand, against the end face of said first actuating piston means, and, on the other, against the pressure plate means of said one clutch, at least one of said longitudinal bores each being coordinated to each longitudinal slot between segments, and tab portions provided on the clutch disks which engage into the slots, being recessed corresponding to the contour of said cylindrical pins, the abutment means for the clutches being of disk-shaped construction provided with outwardly extending tab portions which correspond approximately to the slot width in the entrainment portion, an annular groove being provided in all sectors of the entrainment portion and the abutment means with the tab portions being inserted into the annular groove in the direction from the longitudinal slots and being secured in this position.

19. An actuating mechanism for two friction clutches, especially for shifting clutches in automatically shifted motor vehicle change-speed transmissions, which are arranged within a rotating drum-like structure on the same side of a disk-like part supporting the drum-shaped structure and include friction disks, pressure plate means and abutment means, comprising:

first actuating piston means for one of said clutches, second actuating piston means for the other of said friction clutches, said first and second actuating piston means being disposed on the same side of said disk-like part as the repective clutches, abutment means for each of said first and second clutch, the first actuating piston means serving simultaneously as pressure cylinder means for receiving the second actuating piston means, said drum-shaped structure including a completely closed annular drum portion serving for fastening onto an annular portion of the disk-like part, and an entrainment portion split up by longitudinal slots into tongue-shaped segments for receiving therein the disks, abutment means and pressure plate means of the clutches, the abutment means for the clutches being of disk-shaped construction provided with outwardly extending tab portions which correspond approximately to the slot width in the entrainment portion.

20. An actuating mechanism for two friction clutches, especially for shifting clutches in automatically shifted motor vehicle change-speed transmissions, which are arranged within a rotating drum-like structure on the same side of a disk-like part supporting the drum-shaped structure and include friction disks, pressure plate means and abutment means, comprising:

first actuating piston means for one of said clutches, second actuating piston means for the other of said friction clutches, said first and second actuating piston means being disposed on the same side of said disk-like part as the respective clutches, abutment means for each of said first and second clutch, the first actuating piston means serving simultaneously as pressure cylinder means for receiving the second actuating piston means, said drum-shaped structure including a completely closed annular drum portion serving for fastening onto an annular portion of the disk-like part, and an entrainment portion split up by longitudinal slots into tongue-shaped segments for receiving therein the disks, abutment means and pressure plate means of the clutches, the abutment means for the clutches being of disk-shaped construction provided with outwardly extending tab portions which correspond approximately to the slot width in the entrainment portion,

*an* [the] annular groove being provided in all sectors of the entrainment portion and the abutment means with the tab portions being inserted into the annular groove in the direction from the longitudinal slots and being secured in this position.

21. An actuating mechanism for two friction clutches, especially for shifting clutches in automatically shifted motor vehicle change-speed transmissions, which are arranged within a rotating drum-like structure on the same side of a disk-like part supporting the drum-shaped structure, comprising:

first actuating piston means for one of said clutches, second actuating piston means separate from said first actuating piston means for the other of said friction clutches, said first and second actuating piston means being disposed on the same side of said disk-like part as the respective clutches and on the same side relative to the respective clutch and being actuatable independently of one another, the first actuating piston means serving simultaneously as pressure cylinder means for receiving the second actuating piston means, said first friction clutch comprising disk means secured to said drum-shaped structure, said second friction clutch means including disk means secured to said second actuating piston means, said first and second friction clutches being arranged concentrically about one another, the clutch intended to transmit a higher torque being arranged radially outwardly.

22. An actuating mechanism for two friction clutches, especially for shifting clutches in automatically shifted motor vehicle change-speed transmissions, which are arranged within a rotating drum-like structure on the same side of a disk-like part supporting the drum-shaped structure, comprising:

first actuating piston means for one of said clutches, second actuating piston means separate from said first actuating piston means for the other of said friction clutches, said first and second actuating piston means being disposed on the same side of said disk-like part as the respective clutches and on the same side relative to the respective clutch and being actuatable independently of one another, the first actuating piston means serving simultaneously as pressure cylinder means for receiving the second actuating piston means, said first and second friction clutches being arranged concentrically about one another, both clutches comprising drum-shaped driven parts having substantially cylindrical peripheral portions, said cylindrical portions being disposed radially adjacent each other.

23. An actuating mechanism for two friction clutches, especially for shifting clutches in automatically shifted motor vehicle change-speed transmissions, which are arranged within a rotating drum-like structure on the same side of a disk-like part supporting the drum-shaped structure, comprising:

first actuating piston means for one of said clutches, second actuating piston means separate from said first actuating piston means for the other of said friction clutches, said first and second actuating piston means being disposed on the same side of said disk-like part as the respective clutches and on the same side relative to the respective clutch and being actuatable independently of one another, the first actuating piston means serving simultaneously as pressure cylinder means for receiving the second actuating piston means, said first and second friction clutches being arranged concentrically about one another, both clutches comprising drum-shaped driven parts having substantially cylindrical peripheral portions, said cylindrical peripheral portions being disposed radially adjacent each other, the drum-shaped structure receiving therewithin the clutches being formed in one piece with the disk-like part and the hub portion radially inwardly adjoining said disk-like part, said drum-shaped structure being of approximately pot-shaped construction as viewed in longitudinal cross section.

24. An actuating mechanism for two friction clutches, especially for shifting clutches in automatically shifted motor vehicle change-speed transmissions, which are arranged within a rotating drum-like structure on the same side of a disk-like part supporting the drum-shaped structure, comprising:

first actuating piston means for one of said clutches, second actuating piston means separate from said first actuating piston means for the other of said friction clutches, said first and second actuating piston means being disposed on the same side of said disk-like part as the respective clutches and on the same side relative to the respective clutch and being actuatable independently of one another, the first actuating piston means serving simultaneously as pressure cylinder means for receiving the second actuating piston means, said first and second friction clutches being arranged concentrically about one another, both clutches comprising drum-shaped driven parts having substantially cylindrical peripheral portions, said cylindrical peripheral portions being disposed radially adjacent each other, the first actuating piston means being provided radially outwardly thereof with an annular extension the end face of which forms directly the first pressure plate means for the one clutch.

25. An actuating mechanism for two friction clutches, especially for shifting clutches in automatically shifted motor vehicle change-speed transmissions, which are arranged within a rotating drum-like structure on the same side of a disk-like part supporting the drum-shaped structure, comprising:

first actuating piston means for one of said clutches, second actuating piston means separate from said first actuating piston means for the other of said friction clutches, said first and second actuating piston means being disposed on the same side of said disk-like part as the respective clutches and on the same side relative to the respective clutch and being actuatable independently of one another, the first actuating piston means serving simultaneously as pressure cylinder means for receiving the second actuating piston means, said first and second friction clutches being arranged concentrically about one another, the clutch intended to transmit a higher torque being arranged radially outwardly, both clutches comprising drum-shaped driven parts having substantially cylindrical peripheral portions, said cylindrical peripheral portions being disposed radially adjacent each other, the drum-shaped structure receiving therewithin the clutches being formed in one piece with the disk-like part and the hub portion radially inwardly adjoining said disk-like part, and said drum-shaped structure being of approximately pot-shaped construction as viewed in longitudinal cross section, the first actuating piston means being provided radially outwardly thereof with an annular extension the end face of which forms directly the first pressure plate means for the one clutch.

26. An actuating mechanism for two friction clutches, especially for shifting clutches in automatically shifted motor vehicle change-speed transmissions, which are arranged within a rotating drum-like structure on the same side of a disk-like part supporting the drum-shaped structure and include friction disks, pressure plate means and abutment means, comprising:

first actuating piston means for one of said clutches, second actuating piston means for the other of said friction clutches, said first and second actuating piston means being disposed on the same side of said disk-like part as the respective clutches, the first actuating piston means serving simultaneously as pressure cylinder means for receiving the second actuating piston means, said first and second friction clutches being arranged concentrically about one another, said drum-shaped structure including a disk-like part provided inwardly thereof with a hub portion and along the outer circumference thereof with an annular portion and forming therewith a pressure cylinder for the first actuating piston means, said first actuating piston means being provided outwardly on the side thereof opposite said disk-like part with an annular extension and the second actuating piston means being inserted between said annular extension and said hub portion, the clutch intended to transmit a higher torque being arranged radially outwardly, both clutches comprising drum-shaped driven parts having substantially cylindrical peripheral portions, said cylindrical peripheral portions being disposed radially adjacent each other, said drum-shaped structure receiving therewithin the clutches being formed in one piece with the disk-like part and the hub portion thereof and being of approximately pot-shaped construction as viewed in longitudinal cross section, the end face of said annular extension forming directly the first pressure plate means for the first clutch means, at least one discharge bore means for the pressure cylinder of the second clutch being provided within the anular extension of the first actuating piston means and valve means including spring means for controlling said discharge bore means, said valve means being operable to keep said discharge bore means closed to open said discharge bore means with a build-up of pressure within the pressure cylinder of the first clutch and to close said discharge bore means with a build-up of pressure in the actuating cylinders of both clutches or in the pressure cylinder of the second clutch alone.

27. An actuating mechanism for two friction clutches, especially for shifting clutches in automatically shifted motor vehicle change-speed transmissions, which are arranged within a rotating drum-like structure on the same side of a disk-like part supporting the drum-shaped structure and include friction disks, pressure plate means and abutment means, comprising:

first actuating piston means for one of said clutches, second actuating piston means for the other of said friction clutches, said first and second actuating piston means being disposed on the same side of said disk-like part as the respective clutches, the first actuating piston means serving simultaneously as pressure cylinder means for receiving the second actuating piston means, said first and second friction clutches being arranged concentrically about one another, said drum-shaped part including a disk-like part provided inwardly thereof with a hub portion and along the outer circumference thereof with an annular portion and forming therewith a pressure cylinder for the first actuating piston means, said first actuating piston means being provided outwardly on the side thereof opposite said disk-like part with an annular extension and the second actuating piston means being inserted between said annular extension and said hub portion, the clutch intended to transmit a higher torque being arranged radially outwardly, both clutches comprising drum-shaped driven parts having substantially cylindrical peripheral portions, said cylindrical peripheral portions being disposed radially adjacent each other, at least one discharge bore means for the pressure cylinder of the second clutch means being provided within the annular extension of the first actuating piston means and valve means including spring means for controlling said discharge bore means, said valve means being operable to keep said discharge bore means closed, to open said discharge bore means with a build-up of pressure within the pressure cylinder of the first clutch and to close said discharge bore means with a build-up of pressure in the actuating cylinders of both clutches or in the pressure cylinder of the second clutch alone.

28. An actuating mechanism for two friction clutches, especially for shifting clutches in automatically shifted motor vehicle change-speed transmissions, which are arranged within a rotating drum-like structure on the same side of a disk-like part supporting the drum-shaped structure, comprising:

first actuating piston means for one of said clutches, second actuating piston means for the other of said friction clutches, said first and second actuating piston means being disposed on the same side of said disk-like part as the respective clutches, the first actuating piston means having an annular extension and serving simultaneously as pressure cylinder means for receiving the second actuating piston means, said first and second friction clutches being arranged concentrically about one another, at least one discharge bore means for the pressure cylinder of the second clutch means being provided within the annular extension of the first actuating piston means and valve means for controlling said discharge bore means to normally keep said discharge bore means closed, to open said discharge bore means with a build-up of pressure within the pressure cylinder of the first clutch and to close said discharge bore means with a build-up of pressure in the actuating cylinder of both clutches or in the pressure cylinder of the second clutch alone.

29. An actuating mechanism for two friction clutches, especially for shifting clutches in automatically shifted motor vehicle change-speed transmissions, which are arranged within a rotating drum-like structure on the same side of a disk-like part supporting the drum-shaped structure, comprising:

first actuating piston means for one of said clutches, second actuating piston means for the other of said friction clutches, said first and second actuating piston means being disposed on the same side of said disk-like part as the respective clutches, the first actuating piston means serving simultaneously as pressure cylinder means for receiving the second actuating piston means, said first and second friction clutches being arranged concentrically about one another, the clutch means intended to transmit a higher torque being arranged radially outwardly, both clutches comprising drum-shaped driven parts having substantially cylindrical peripheral portions, said cylindrical peripheral portions being disposed radially adjacent each other, said drum-shaped structure receiving therewithin the clutches being formed in one piece with the disk-like part and the hub portion thereof and being of approximately pot-shaped construction as viewed in longitudinal cross section, the first actuating piston means being provided radially outwardly thereof with an annular extension the end face of which forms directly the first pressure plate means for the first clutch, at least one discharge bore means for the pressure cylinder of the second clutch being provided within the annular extension of the first actuating piston means and valve means including spring means for controlling said discharge bore means to normally keep said discharge bore means closed, to open said discharge bore means with a build-up of pressure within the pressure cylinder of the first clutch and to close said discharge bore means with a build-up of pressure in the actuating cylinders of both clutches or in the pressure cylinder of the second clutch alone.

References Cited

The following references, cited by the Examiner, are of record in the patented file of this patent or the original patent.

UNITED STATES PATENTS

| | | | |
|---|---|---|---|
| 2,113.088 | 4/1938 | Johnsson | 192—87.15 X |
| 2,919,778 | 1/1960 | Aschauer | 192—87.17 X |

FOREIGN PATENTS

| | | | |
|---|---|---|---|
| 898,240 | 11/1953 | Germany | 192—87.11 |

ARTHUR T. McKEON, Primary Examiner